United States Patent [19]

Metcalf

[11] 3,948,472

[45] Apr. 6, 1976

[54] MOUNTING ARRANGEMENT FOR SMALL OUTBOARD MOTORS

[75] Inventor: Silas L. Metcalf, Waukegan, Ill.

[73] Assignee: Outboard Marine Corporation, Waukegan, Ill.

[22] Filed: May 3, 1974

[21] Appl. No.: 466,537

[52] U.S. Cl. ........................ 248/4; 115/17; 248/280

[51] Int. Cl.² ...................... F16M 1/02; B63H 21/26

[58] Field of Search ............... 248/4, 280, 281, 284; 115/17, 18 R; 74/469

[56] References Cited

UNITED STATES PATENTS

| | | | |
|---|---|---|---|
| 1,638,938 | 8/1927 | Koenigkramer | 248/281 X |
| 1,686,341 | 10/1928 | Nathanson | 248/281 X |
| 1,840,948 | 1/1932 | Harvey | 115/18 R |
| 2,540,429 | 2/1951 | Cordes | 74/469 |
| 2,901,194 | 8/1959 | Shontz | 248/4 |
| 3,245,641 | 4/1966 | Hart | 248/4 |
| 3,263,516 | 8/1966 | Chisholm | 74/469 X |
| 3,674,228 | 7/1972 | Horton | 248/4 |
| 3,861,628 | 1/1975 | Krieger | 115/17 |

*Primary Examiner*—George E. A. Halvosa
*Attorney, Agent, or Firm*—Michael, Best & Friedrich

[57] ABSTRACT

Disclosed herein is an outboard motor mounting arrangement including first and second links pivotally connected to a bracket adapted to support an outboard motor and pivotally connected to a member adapted to be mounted on a boat hull for pivotal movement of the bracket relative to the member between a storage position and an operating position, and a tension spring which is connected between the links to releasably urge the engine support bracket towards the operating position. The links are arranged so that the support bracket moves substantially vertically during initial movement from the operating position towards the storage position to thereby reduce effort required to raise the outboard motor from the water.

In one embodiment, the first link includes a rigid element which at one end is pivotally connected to the bracket and, at the other end, is pivotally connected to a support arm which in turn is pivotally mounted on the member. In another embodiment, the first link includes a rigid element which at one end is pivotally connected to the bracket and the member includes an upstanding flange having an arcuate slot in which the other end of the element is supported for pivotal and arcuate movement relative to the member.

13 Claims, 5 Drawing Figures

Fig. 1

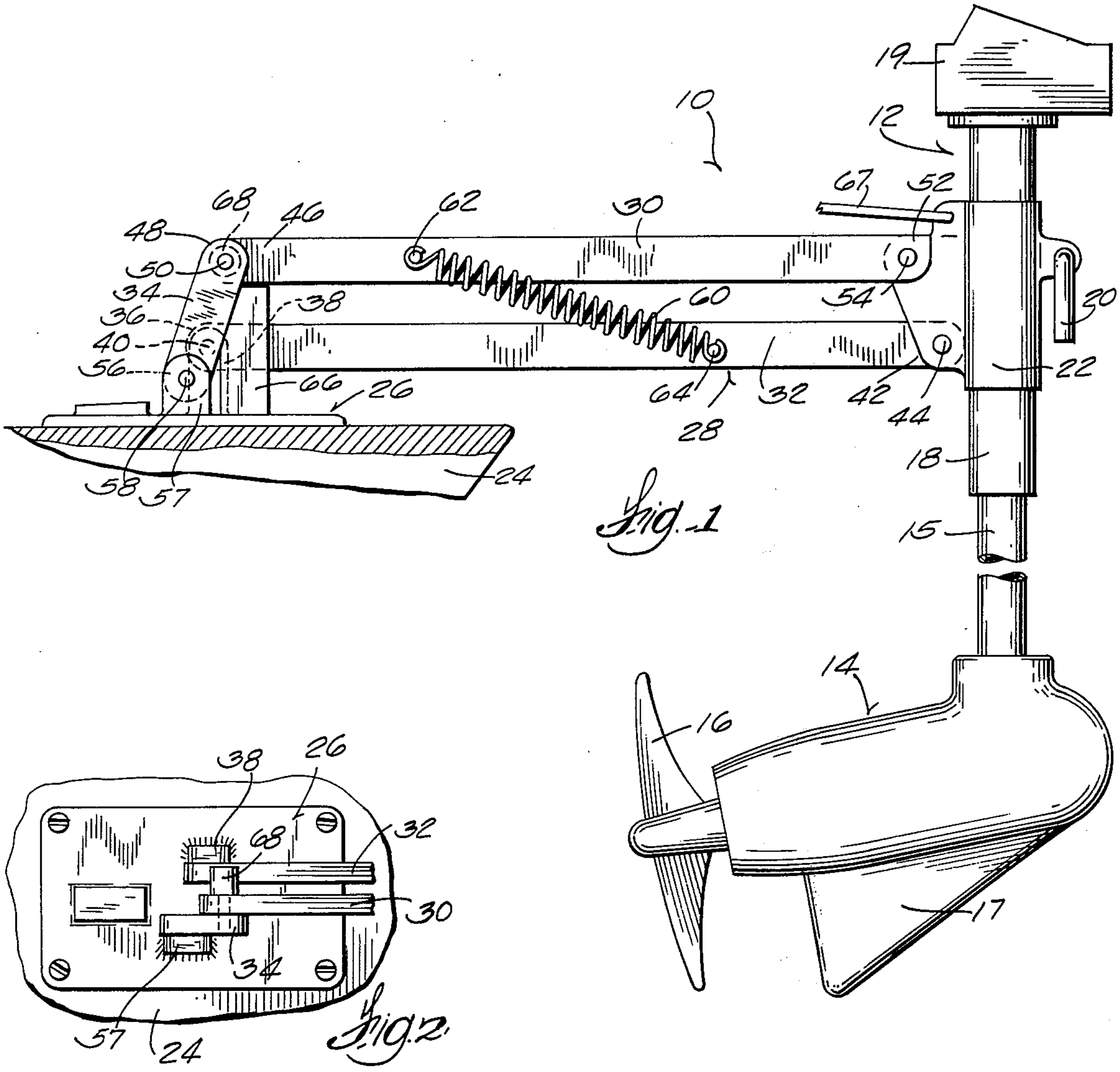
Fig. 1
Fig. 2
Fig. 3
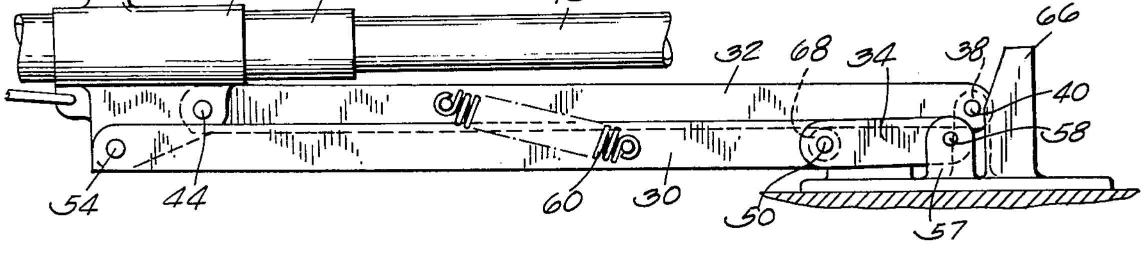

MOUNTING ARRANGEMENT FOR SMALL OUTBOARD MOTORS

BACKGROUND OF THE INVENTION

This invention relates to outboard motors for boats and, more particularly, to mounting arrangements for low horsepower outboard motors.

Low powered, electrically operated outboard motors are commonly used for fishing, particularly trolling, when a low speed, relatively silent operation of the boat is desired. These motors usually are mounted on a boat in a manner so they can be withdrawn from the water and retained inside the boat in a retracted position when the boat is being propelled at normal speeds by a higher horsepower motor or being transported. For the sake of convenience, the motor mount desirably should be arranged in the manner to afford movement of the motor between a retracted or storage position and an extended or operating position with a minimum of effort and without having to manually adjust the position of the motor. Also, in order to minimize damage to the motor when an underwater obstruction is engaged, the mounting arrangement desirably should permit upward movement of the motor so that the obstruction can be cleared.

Examples of prior art outboard motor mounting arrangements are disclosed in the following U.S. Pat. Nos:

| Inventor | Pat. No. | Issue Date |
|---|---|---|
| Heinke | 1,120,485 | December 8, 1914 |
| Shontz | 2,901,194 | October 25, 1959 |
| Taylor | 2,960,057 | November 15, 1960 |
| Scivally | 3,052,204 | September 4, 1962 |
| Evans | 3,119,365 | January 28, 1964 |
| Ibbs | 3,245,640 | April 12, 1966 |
| Wilkerson | 3,604,674 | September 14, 1971 |
| Jackson | 3,629,885 | December 28, 1971 |
| Bartosch | 3,645,483 | February 29, 1972 |
| Horton | 3,674,228 | July 4, 1972 |
| Harris et al | 3,724,790 | April 3, 1973 |
| Henning | 3,765,369 | October 16, 1973 |

SUMMARY OF THE INVENTION

The invention provides an outboard motor mounting arrangement including first and second link means pivotally connected at one end to a bracket adapted to support an outboard motor and pivotally connected at the other end to a mountng member adapted to be mounted on a boat hull for pivotal movement between a storage position in which the link means extend in one direction from the member and an operating position in which the link means extend in a generally opposite direction from the member, and means for pivotally urging the first link means toward the bracket and thereby releasably maintain the bracket in the operating position.

In one embodiment, the first link means includes a rigid link which, at one end, is pivotally connected to the bracket and, at the other end, is pivotally connected to a support mounted on the member for arcuate movement relative to the member and means are provided for limiting the arcuate movement of the support towards the bracket to assist in locating the bracket in the operating position.

In another embodiment, the first link means includes a rigid link which, at one end, is pivotally connected to the bracket and, at the other end, is supported in an arcuate slot in an upstanding flange provided on the member for pivotal and arcuate movement relative to the member.

One of the principal features of the invention is the provision of an outboard motor mounting arrangement which affords movement of the motor between an operating position and a storage position with minimum effort.

Another feature of the invention is the provision of such a mounting arrangement which affords substantially vertical movement of the motor during initial travel from the operating position towards the storage position.

Another further feature of the invention is the provision of an outboard motor mounting arrangement which releasably holds the motor in the operating position so that, upon engaging an underwater obstruction, the motor can move upwardly to clear the obstruction.

Other features and advantages of the invention will become apparent upon reviewing the following drawings, detailed description and appended claims.

BRIEF DESCRIPTION OF THE DRAWINGS

FIG. 1 is a side elevation view of an outboard motor mounting arrangement which embodies various of the features of the invention and which is shown in the operating position.

FIG. 2 is a fragmentary top view of the mounting arrangement shown in FIG. 1.

FIG. 3 is a fragmentary view of the mounting arrangement in FIG. 1 shown in the storage position.

DESCRIPTION OF THE PREFERRED EMBODIMENTS

Figure 4:
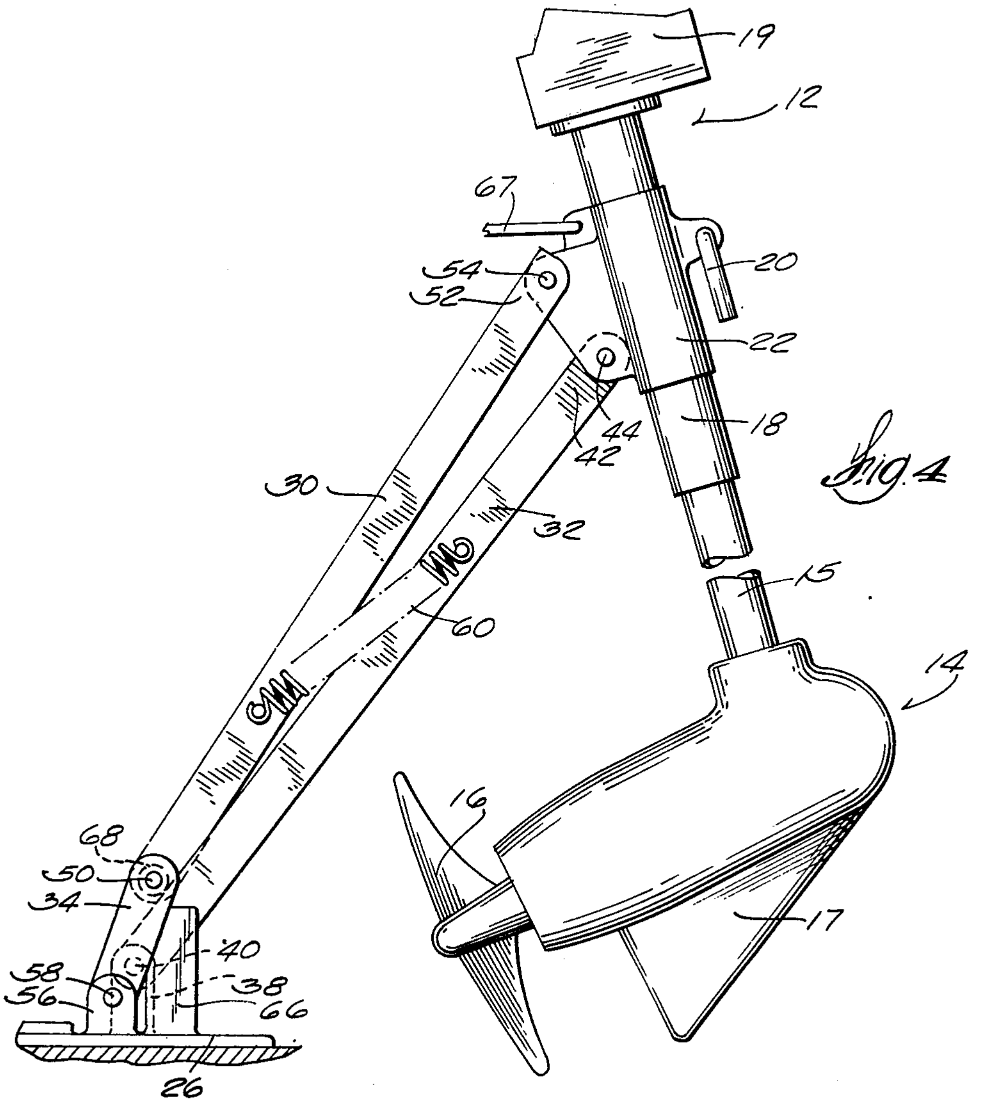
FIG. 4 is a view similar to FIG. 1 with the mounting arrangement shown in a position intermediate the operating and storage positions.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

Illustrated in the drawing is a mounting arrangement 10 adapted to support a small outboard motor 12 including a propulsion unit 14 which is connected to the lower end of a motor tube 15, has an electric motor (not shown) which drives a propeller 16, and has a skeg 17. The upper portion of the motor tube 15 is rotatably mounted in a sleeve 18 which, at the upper end, is connected to a housing 19. The housing 19 encases the actuating portion of a steering mechanism (not shown) by which the motor tube 15 can be selectively rotated with respect to the housing 19. Fixedly connected to the sleeve 18 by suitable means, such as a clamp 20, is a support bracket 22.

Fixedly connected to a boat hull 24 is a mounting member 26. Pivotally connected between the support bracket 22 and the mounting member 26 is a linkage assembly 28 which affords movement of the outboard motor 12 between an extended or operating position shown in FIG. 1 and a retracted or storage position shown in FIG. 3.

In the specific embodiment illustrated in FIGS. 1–4, the linkage assembly 28 includes a first or upper rigid link 30, a second or lower rigid link 32, and a support arm 34. For purposes of description, the links 30 and 32 respectively will be referred to as the upper and lower links which is indicative of their relative position when the support bracket 22, and thus the outboard motor 12, is in the operating position shown in FIG. 1.

The inner end 36 of the lower link 32 is pivotally connected to an upstanding ear 38 on the mounting member 26 for relative pivotal movement about a first transverse pivot axis 40 and the outer end 42 of the lower link 32 is pivotally connected to the support bracket 22 for relative pivotal movement about a second transverse pivot axis 44. The inner end 46 of the upper link 30 is pivotally connected to the upper end 48 of the support arm 34 for relative pivotal movement about a third transverse pivot axis 50 and the outer end 52 of the upper link 30 is pivotally connected to the support bracket 22 for relative pivotal movement about a fourth pivot axis 54. The lower end 56 of the support arm 34 is pivotally connected to an upstanding ear 57 on the mounting bracket 26 for relative pivotal movement about a fifth pivot axis 58. Thus, the upper and lower links 30 and 32 are movable relative to the mounting member 26 between the operating position shown in FIG. 1 (where the links 30 and 32 extend in one direction from the mounting member 26) and the storage position shown in FIG. 3 (where the links 30 and 32 extend in the opposite direction from the mounting member 26).

As shown in FIG. 1, when the support bracket 22 is in the operating positon, the upper and lower links 30 and 32 are generally horizontal and parallel to each and the pivot axes 40, 44, 50, and 54 are disposed in a generally trapezoidal pattern. In the preferred construction illustrated, the upper link 30 is somewhat shorter than the lower link 32, the pivot axis 50 for the inner end of the upper link 30 is located forward of the pivot axis 40 for the inner end of the lower link 32, and the pivot axis 54 for the outer end of the upper link 30 is located rearward of the pivot axis 44 for the outer end of the lower link 32. Preferably, the distance between the pivot axes 40 and 50 is greater than the distance between the pivot axes 44 and 54 when the support bracket 22 is in the operating position. Also, the lower pivot axis 58 for the support arm 34 preferably is located below and rearward of the pivot axis 40 for reasons explained below.

In accordance with the invention, means are provided for yieldably urging the upper link 30 towards the support bracket 22 to thereby releasably maintain the support bracket 22 in the operating position. In the specific constructon illustrated, such means comprises a coiled, tension spring 60 which is connected at one end 62 to the upper link 30 at a location remote from the support bracket 22 and is connected at the other end 64 to the lower link 32 at a location remote from but closer to the support bracket 22.

Extending from the mounting member 26 to assist in locating the support bracket 22 in the operating position is an upstanding flange 66 which is engaged by the support arm 34 and serves as a stop for limiting arcuate movement of the support arm 34 toward the support bracket 22, i.e., limits clockwise movement of the support arm 34 about the pivot axis 58 as viewed in FIG. 1.

When the support bracket 22 is in the operating position, the spring 60 urges the support arm 34 into engagement with the flange 66 and thereby restrains counterclockwise movement of the support arm 34 about the pivot axis 58 in response to propeller thrust during operation of the outboard motor 12.

When the support bracket 22 is in the operating position, the spring 60 also exerts an upward force on the lower link 32, i.e., a counterclockwise force on the lower link 32 relative to the pivot axis 40, tending to counterbalance the cantilever effect of the outboard motor 12. Accordingly, the spring 60 is sized so that this upward force is less than the moment of the outboard motor 12 about the pivot axis 40. With this arrangement, the outboard motor 12 is free to move upwardly to clear an underwater obstruction engaged by the skeg 17 and then return by its own weight to the operating position.

An operator can raise the outboard motor 12 from the water by pulling on a pull rope 67 or the like suitably attached to the support bracket 22. During initial movement towards the storage position, the upper and lower links 30 and 32 pivot about respective pivot axes 40 and 50 with the support arm 34 remaining stationary. Because of the trapezoidal arrangement of the pivot axes 40, 44, 50 and 54 and the different lengths of the links 30 and 32, the outboard motor 12 travels through a substantially vertical path for several inches (e.g., about 12 inches or more) during initial movement of the support bracket 22 toward the storage position. In other words, the outboard motor 12 initially is raised substantially vertically through the water, rather than being swung through a relatively large arc as is the case with most prior art mounting arrangements. Accordingly, substantially less effort is required to raise the motor out of the water.

The force exerted on the lower link 32 by the spring 60 further reduces the force required to raise the motor 12 from the water. By making the distance between the centers of the pivot axes 40 and 50 greater than the distance between the centers of the pivot axes 44 and 54 (rather than equal), the vertical distance through which the outboard motor 12 travels before starting to swing to an arcuate path can be increased.

As the outboard motor 12 is moved towards the storage position after being raised from the water, the lower link 32, at a position intermediate the operating and storage positions, engages a transversely extending protrusion, such as a roller or shaft 68, located coincident with the pivot axis 50 (See FIG. 4). The biasing force of the spring 60 maintains the lower link 32 in engagement with the shaft 68, causing the support arm 34 to pivot about the pivot axis 58 during continued movement of the support bracket 22 toward the storage position. When the support bracket 22 has reached the storage position, the outboard motor 12, due to the relative pivotal movement between the outer ends of the links 30 and 32 and the support bracket 22 automatically assumes a substantially horizontal position (See FIG. 3).

As mentioned above, the lower pivot axis 58 for the support arm 34 preferably is located below the lower pivot axis 40 for the lower link 32. This arrangement insures that the outboard motor 12 will lie substantially flat on the boat hull 24 when the support bracket 22 is in the storage position. Also, the pivot axis 58 preferably is located rearwardly of the pivot axis 40 so that the outboard motor 12 is swung through a smaller arcuate path while being swung towards the storage position after being raised from the water.

During the return movement of the outboard motor 12 from the storage position to the operating position, the spring 60 maintains the lower link arm 32 in engagement with the shaft 68 so that the upper link 30 pivots about the support arm pivot axis 58 until the support arm 34 engages the flange 66. Thereafter, the upper link 30 pivots about the pivot axis 50 until the support bracket 22 reaches the operating position. Due to the relative pivotal movement between the outer ends of the links 30 and 32 and the support bracket 20, the outboard motor 12 automatically returns to an operating orientation without making any manual adjustments.

Figure 5:
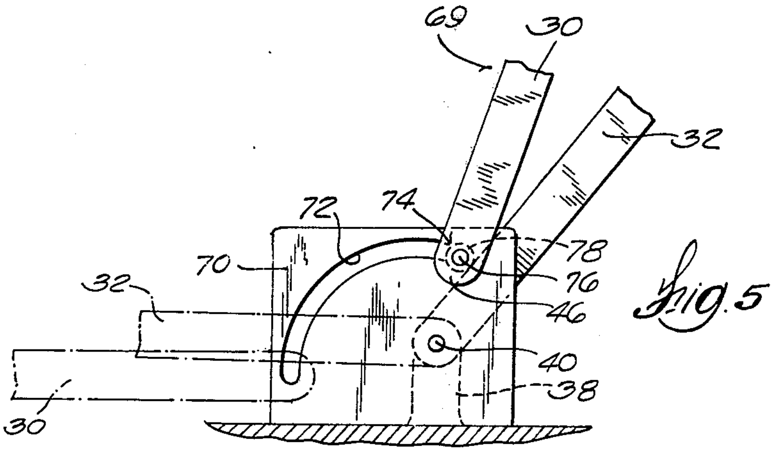
FIG. 5 is a fragmentary view of an alternate embodiment of the motor mounting arrangement.

Illustrated in FIGS. 5–6 is an alternate embodiment including a linkage assembly 69 in which the support arm 34 shown in FIGS. 1–4 is replaced by a vertically extending plate 70 to which the inner end 46 of the upper link 30 is connected for pivotal and arcuate movement relative to the support member 26. Otherwise the linkage assembly 69 is substantially the same as the linkage assembly 28 illustrated in FIGS. 1–4 and common components are identified with common reference numerals.

The inner end 36 of the lower link 32 is pivotally connected to the mounting member 26 in the same manner shown in FIGS. 1–4 for pivotal movement about the pivot axis 40. The plate 70 includes an arcuate slot 72 which provides the same pivotal action provided by the support arm 34 of FIGS. 1–4 during movement of the support bracket 22 between the operating and storage positions. When the support bracket 22 is in the operating position, the inner end 46 of the upper link 30 is pivotal about a transverse pivot axis 74 (corresponding to the pivot axis 50 of FIGS. 1–4) formed by a pin or shaft 76 which is slidably and rotatably supported in the slot 72. The shaft 76 includes a transversely extending protrusion 78 which is engaged by the lower link 32 during movement of the support bracket 22 towards the storage position in the same manner as the shaft 68 in FIGS. 1–4. The pivot axes 40 and 74 are located relative to each other and to the pivot axes 44 and 54 in the same manner as described above to form a generally trapezoidal pattern when the support bracket 22 is in the operating position.

During initial movement of the support bracket 20 from the operating position towards the storage position, the shaft 76 rotates relative to the plate 70, while being maintained in enagement with the upper terminal portion of the slot 72 by the biasing force of the spring 60 and the inner end of the lower link 32 pivots about the pivot axis 40. At an intermediate positon in FIG. 5, the lower link 32 engages the shaft extension 78. As the suppport bracket 22 is moved further towards the storage position, the spring 60 maintains the lower link 32 in engagement with the shaft extension 78 causing the shaft 76 to be moved downwardly in the slot 72 until it reaches the lower terminal portion thereof. During return movement of the support bracket 22 from the storage position to the operating position, the shaft 76 moves upwardly in the slot 72 and engages the upper terminal portion of the slot 72 at the intermediate position.

Various of the features of the invention are set forth in the following claims.

What is claimed is:

1. An outboard motor mounting arrangement including a member adapted to be mounted on a boat hull, a bracket movable between a storage position and an operating position and adapted to support an outboard motor, a first rigid link having one end pivotally connected to said bracket about an axis fixed with respect to said bracket and having a second end pivotally connected to said member about an axis fixed with respect to said member so as to extend in one direction from said member when said bracket is in the operating position, and so as to extend in the opposite directon from said member when said bracket is in the storage position, link means including a second rigid link having one end pivotally connected to said bracket about an axis fixed with respect to said bracket and having a second end, and means including a movable pivotal connection connecting said second end of said second link to said member, and means for yieldably urging said movable pivotal connection in the direction toward said bracket when said bracket is in the operating position to thereby releasably maintain said bracket in the operating position.

2. An outboard motor mounting arrangement according to claim 1 wherein said means connecting said second end of said second link to said member includes a support connected to said member for arcuate movement relative to said member and to said second link by said movable pivotal connection, and means for limiting arcuate movement of said support towards said bracket to assist in locating said bracket in the operating position.

3. An outboard motor mounting arrangement according to claim 2 wherein said means for limiting arcuate movement of said support comprises an upstanding flange which is engaged by said support during movement of said bracket from the storage position towards the operating position.

4. An outboard motor mounting arrangement according to claim 2 wherein said link means includes means for engaging said second link to provide coordinated pivotal movement of said support and said second link relative to said member during movement of said bracket between the storage position and a position intermediate the operating position and the storage position.

5. An outboard motor mounting arrangement according to claim 4 wherein said engaging means comprises a shaft which is coaxial with said movable pivotal connection.

6. An outboard motor mounting arrangement according to claim 2 including first, second, third and fourth pivot axes respectively defined at the pivotal connections between said second link and said bracket, between said first link and said bracket, between said second link and said support, and between said first link and said member, the distance between said second and fourth pivot axes being greater than the distance between said first and third pivot axes when said bracket is in the operating position.

7. An outboard motor mounting arrangement according to claim 6 wherein said first pivot axis is located in one direction from said second pivot axis and said third pivot axis is located in the opposite direction from said fourth pivot axis with respect to said bracket when said bracket is in the operating positon.

8. An outboard motor mounting according to claim 6 including a fifth pivot axis defined at the pivotal connection between said support and said member, said pivot axis being located in the direction away from said fourth pivot axis with respect to said bracket when said bracket is in the operating posiiton.

9. An outboard motor mounting arrangement according to claim 8 wherein said fifth pivot axis is located below said fourth pivot axis.

10. An outboard motor mounting arrangement according to claim 1 wherein said urging means comprises a spring having a first end connected to said second link at a location remote from said bracket and having a second end connected to said first link at a location remote from but closer to said bracket than the first end of said spring.

11. An outboard motor mounting arrangement according to claim 1 wherein said means connecting said second end of said second link further includes a plate extending generally vertically from said member and including an arcuate slot, and wherein said movable pivotal connection extends in said slot for pivotal and arcuate movement relative to said member.

12. An outboard motor mounting arrangement including a member adapted to be mounted on a boat hull, a bracket adapted to support an outboard motor, first and second rigid links each having a first end pivotally connected to said bracket in spaced relation and each having a second end, means pivotally connecting said second ends of said links to said member to provide pivotal movement of said bracket relative to said member between a bracket operating position in which said links extend in one direction from said member and a bracket storage position in which said links extend in the direction generally opposite to said one direction, said pivotal connecting means including a support pivotally connected to the second end of said first link and mounted on said member for arcuate movement relative to said member, a spring connected between said links for urging said first link means toward said bracket when said bracket is in the operating position to thereby releasably maintain said bracket in the operating position, an upstanding flange on said member for engaging said support to limit arcuate movement of said support toward said bracket and thereby assist in locating said bracket in the operating position, and means associated with said first link for engaging said second link to provide coordinated pivotal movement of said support and said first link relative to said member during movement of said bracket between the storage position and a position intermediate the storage and operating positions.

13. An outboard motor mounting arrangement according to claim 12 including first, second, third and fourth pivot axes respectively defined at the pivotal connections between said first link and said bracket, between said second link and said bracket, between said first link and said support, and between said second link and said member, the distance between said second and fourth pivot axes being greater than the distance between said first and third pivot axes when said bracket is in the operating position.

* * * * *